Figure 1:
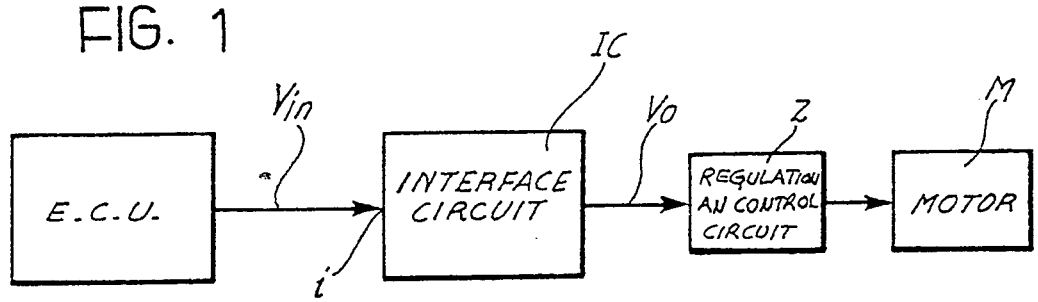

United States Patent [19]

De Filippis et al.

[11] Patent Number: 5,361,025
[45] Date of Patent: Nov. 1, 1994

[54] INTERFACE CIRCUIT FOR GENERATING AND ANALOGUE SIGNAL TO CONTROL THE SPEED OF ROTATION OF A DIRECT-CURRENT ELECTRIC MOTOR

[75] Inventors: Pietro De Filippis, Milan; Franco Salerno, Alpignano; Paolo Mastella, Camino, all of Italy

[73] Assignee: Industrie Magneti Marelli SPA, Milan, Italy

[21] Appl. No.: 37,286

[22] Filed: Mar. 26, 1993

[30] Foreign Application Priority Data

Mar. 26, 1992 [IT] Italy .................. T092A000267

[51] Int. Cl.$^5$ ............................................. G05B 1/01
[52] U.S. Cl. .................................. 318/599; 318/601; 318/604; 388/801; 388/809
[58] Field of Search ............... 318/599, 600, 601, 604; 388/801, 809

[56] References Cited

U.S. PATENT DOCUMENTS 4,572,996  2/1986  Hanschke et al. ................. 318/341

FOREIGN PATENT DOCUMENTS 0295710  12/1988  European Pat. Off. .

OTHER PUBLICATIONS

"Full-wave sensorless drive IC's for brushless DC motors," by Dominique Pouilloux, *Electronic Components and Applications*, vol. 10, No. 1, pp. 2-11 (1990).

*Primary Examiner*—William M. Shoop, Jr.
*Assistant Examiner*—Brian Sircus
*Attorney, Agent, or Firm*—Edward D. Manzo; Ted K. Ringsred

[57] ABSTRACT

The interface circuit has a single input terminal for receiving an analog or digital control signal indicative of the required speed of rotation of the motor. The type of input signal is recognised by means of comparator circuits. The input signal is processed differently according to its nature in order, in any case, to output an analog signal acceptable by the regulation and control circuit which pilots the motor.

4 Claims, 5 Drawing Sheets

INTERFACE CIRCUIT FOR GENERATING AND ANALOGUE SIGNAL TO CONTROL THE SPEED OF ROTATION OF A DIRECT-CURRENT ELECTRIC MOTOR

The present invention relates to an interface circuit for generating an analog signal to control the speed of rotation of a direct-current electric motor, particularly a brushless motor of the type which does not have sensors for detecting the angular position of its rotor.

An electric motor of this type is normally piloted by a control circuit which can provide its motor with a speed of rotation reference constituted by an analog signal which is generally variable with time.

In some applications the control of the speed of rotation of the motor is effected by an external electronic control unit and may have various characteristics; when the unit comprises a microprocessor, the control signal output by such a unit is typically a variable duty-cycle, digital signal (a PWM-type signal), whereas in other applications the speed-control signal may be a linear, analog signal of a type which varies slowly.

The object of the present invention is to provide a circuit for interfacing between an external electronic control unit and the control circuit of a direct-current electric motor, particularly a brushless motor, wherein the same input terminal or pin of the interface circuit can receive either a variable duty-cycle, digital control signal, or an analog signal, the amplitude of which may vary within a predetermined range, the interface circuit in any case outputting an analog signal which can be applied to the control circuit of the motor in order to pilot its speed. This object is achieved, according to the invention, by means of an interface circuit characterized in than it comprises: an input terminal for receiving a control signal indicative of the required speed of rotation, analog-signal conditioning means for outputting an analog signal of an amplitude substantially proportional to the amplitude of an analog signal supplied to its input, conversion circuitry for converting a PWM signal into an analog signal, the amplitude of which is variable in dependence on the duty-cycle of the PWM signal, and comparator circuitry which can compare the input signal with a maximum threshold and a minimum threshold, and can assume:

a first state when the amplitude of the input signal is such that it remains between the thresholds; in the first state the comparator circuitry sends the input signal to the analog-signal conditioning means; and a second state when the input is of an amplitude such as to cross the thresholds; in the second state these comparator circuitry, which prevents the input signal from being sent to the analog-signal conditioning means, applies to the conversion circuitry a PWM signal having a predetermined phase relationship with the crossing of the thresholds by the input signal and connects the output of the conversion circuitry to the input of the conditioning circuitry.

As will become clearer from the following, description the circuit defined above can accept either a PWM input signal or a linear analog input signal the amplitude of which may vary within a predetermined range between the minimum and maximum thresholds associated with the comparator circuitry.

Figure 2:
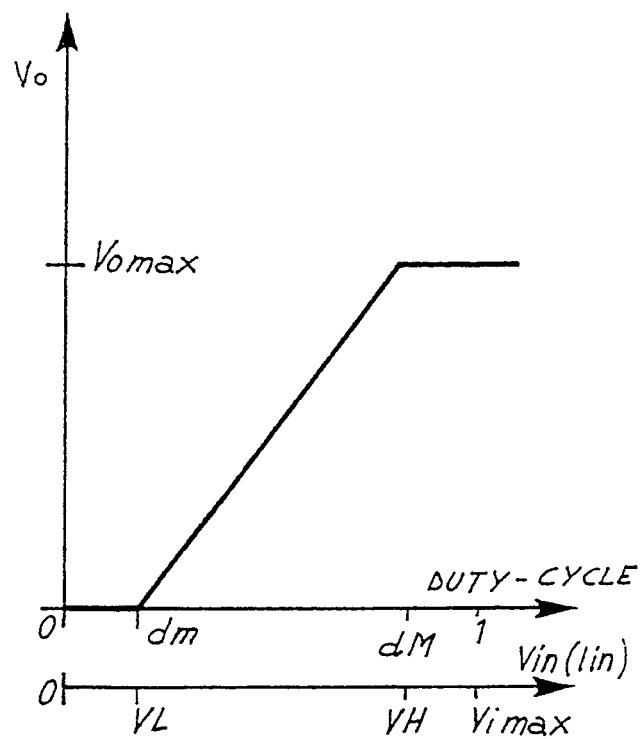
Figure 3:
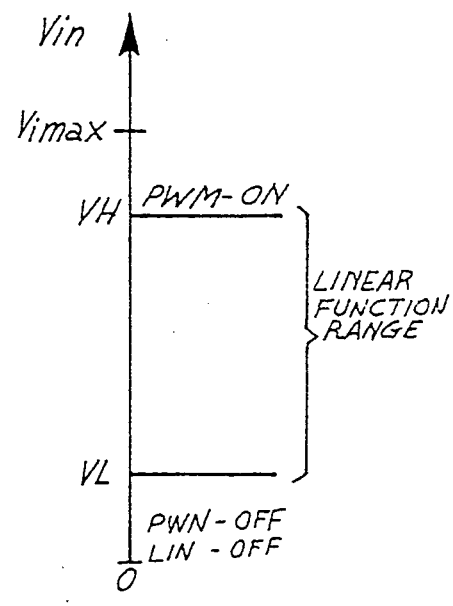
Figure 4:
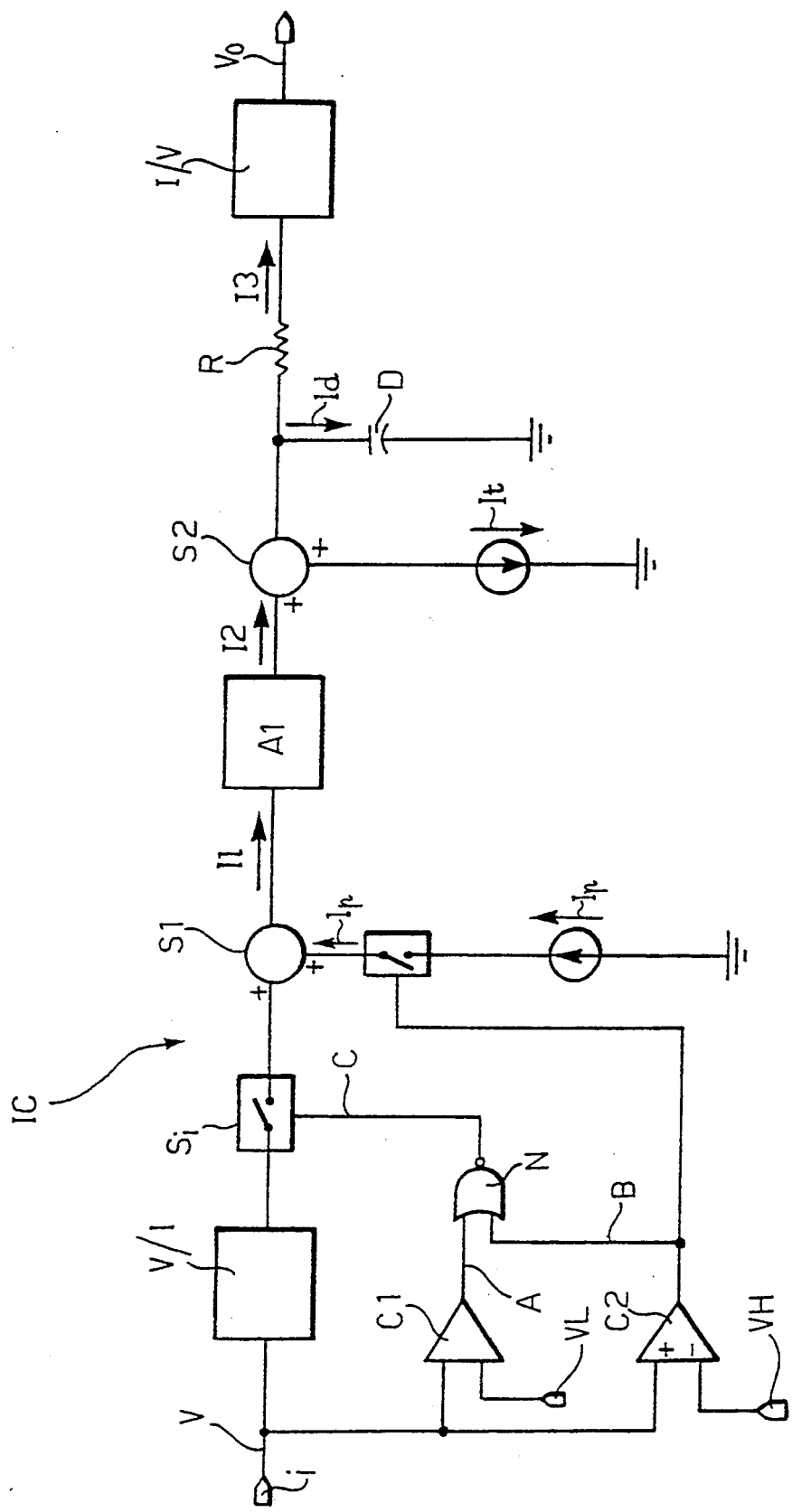
Figure 5:
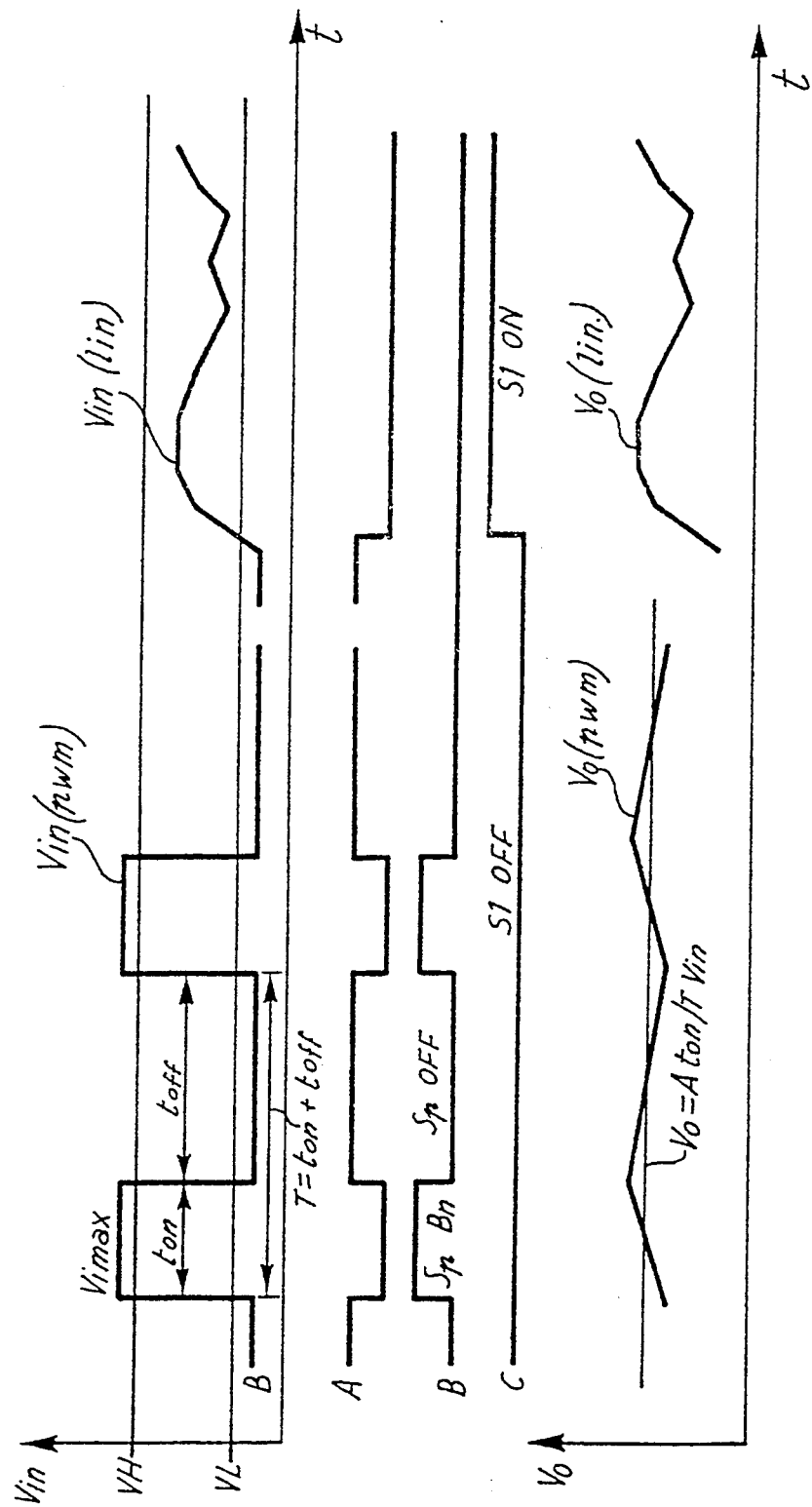
Figure 7:
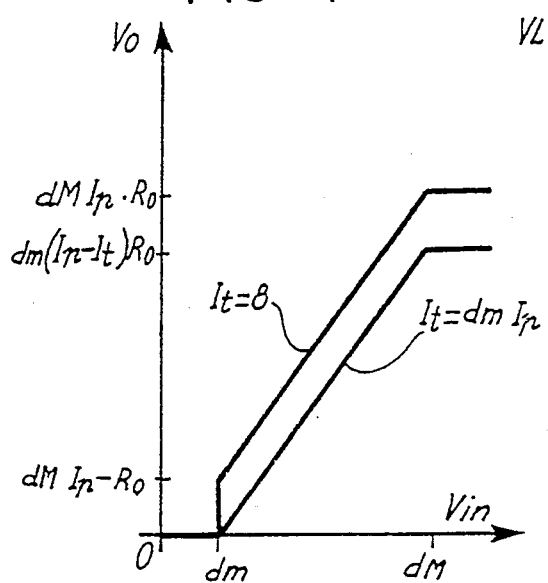
Figure 8:
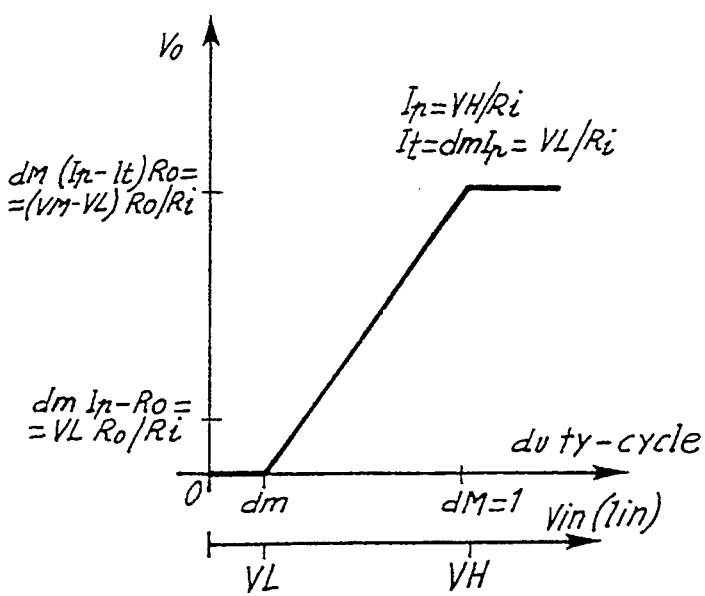
Figure 9:
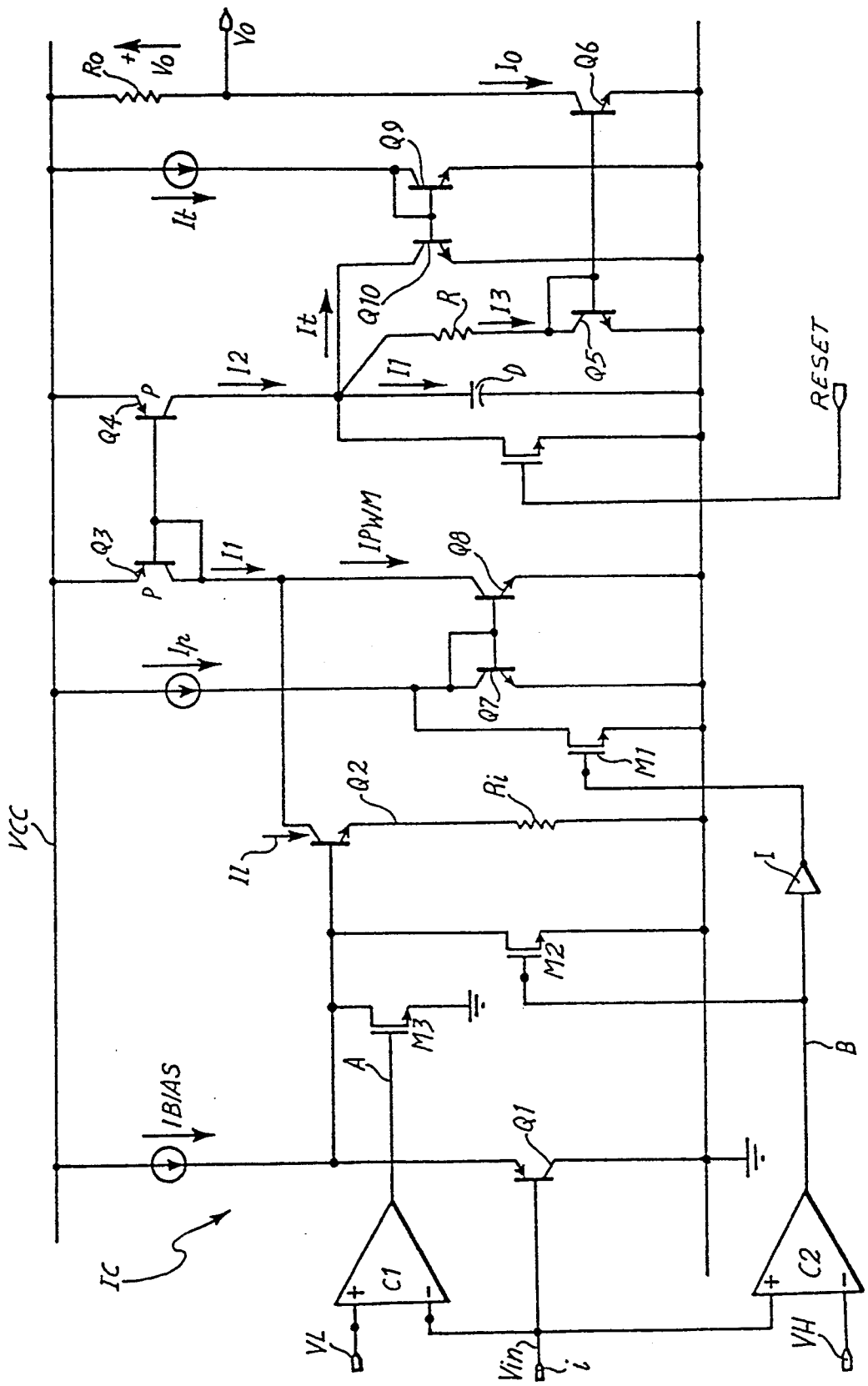

Further features and advantages of the invention will become apparent from the following detailed description, provided purely by way of non-limiting example, with reference to the appended drawings, in which:

FIG. 1 is a block diagram of a control system for a direct-current electric motor, particularly a brushless motor, including a circuit according to the invention, FIG. 2 is a graph showing the input voltage/output voltage characteristic of a circuit according to the invention, FIG. 3 is a graph showing the limits of variation of the digital PWM and analog input signals which may be applied to the input of a circuit according to the invention, FIG. 4 is a block diagram of an embodiment of the circuit according to the invention, FIG. 5 is a series of graphs showing examples of curves of signals in the circuit of FIG. 4, FIGS. 6 to 8 are cartesian graphs relating to the output voltage/input voltage characteristics of the circuit in FIG. 4, and FIG. 9 is a detailed circuit diagram of an embodiment of the circuit according to the invention.

In FIG. 1, a direct-current electric motor, particularly a brushless motor which does not have sensors for detecting the angular position of its rotor, is indicated M. The motor has an input m to which an analog signal for controlling the speed of rotation of the motor is applied, in operation, by a control and regulation circuit Z of a known type. The input of the control and regulation circuit Z is connected to the output of an interface circuit IC according to the invention, and is intended to receive an analog signal $V_o$ indicative of the required speed of rotation of the motor M. The interface circuit has an input terminal i connected to an electronic control unit ECU.

As already mentioned, and as will become clearer from the following, the interface circuit IC can accept an input control signal either of the variable duty-cycle (PWM) digital type, or of the linear analog type. The circuit can therefore be used equally well to enable the motor M to be piloted by external control units which output speed-control signals of either of the aforementioned types.

Whatever the type of input signal $V_{in}$ applied to the input i of the interface circuit IC, the latter outputs an analog speed-control signal $V_o$.

The static output/input characteristic of the interface circuit IC is shown in FIG. 2, in which the X-axis has been split in two in order better to show the characteristic parameters of the two possible different types of signal, that is, the amplitude of the voltage $V_{in}$ for linear analog signals, and the duty-cycle for PWM digital signals. In any case the output voltage $V_o$ is of the analog type.

When the input signal $V_{in}$ is of the linear analog type, the interface circuit IC behaves substantially as a D.C. amplifier with a characteristic of the type $V_o = G\,V_{in}$ which G is a gain coefficient, whereas in the case of a PWM digital input signal the circuit behaves as a time/voltage converter-amplifier, with a characteristic of the type $V_o = Kd$, where $d = t_{on}/T$ and the duty-cycle $t_{on}$ of the signal is the (variable) time for which the signal remains at a high (on) level within each period T, and K is an amplification constant.

Discrimination between linear analog and PWM digital input signals takes place in the interface circuit IC by virtue of the fact that the dynamic range of the input signal $V_{in}$ is subdivided in the manner shown schematically in FIG. 3:

the dynamic range of the signal $V_{in}$ is in any case between 0 and a maximum value $V_{imax}$;

if the signal $V_{in}$ is of the linear analog type, its amplitude may vary between a minimum value VL and a maximum value VH which are between 0 and $V_{imax}$;

if the signal $V_{in}$ is of the PWM type, the high (on) level of the signal is between VH and $V_{imax}$; the low (off) level of the signal is between 0 and VL.

With reference to FIG. 4, an interface circuit IC according to the invention includes two input threshold comparators C1 and C2 of the inverting and non-inverting types, respectively. The signal inputs of the comparators are connected to the input terminal i, and their reference inputs are connected to reference voltage sources VL and VH respectively.

The outputs of the comparators C1 and C2 are connected to the inputs of a NOR circuit indicated N.

The input of a voltage/current converter V/I is also connected to the input terminal i.

A first electronic switch $S_i$ is interposed between the output of the converter V/I and a first input of an adder S1. The switch has a control input connected to the output of the NOR circuit N.

A current generator $I_p$ is disposed between ground and a second electronic switch $S_p$ which is interposed between the current generator and a second input of the adder S1.

The output of the adder S1 is connected to the input of a current amplifier A1, the output of which is connected to the first input of a further adder S2. A current generator $I_t$ is connected between a second input of the adder S2 and earth.

A capacitor D is connected between the output of the adder S2 and ground. The output of the adder S2 is connected by means of a resistor R to the input of a current/voltage converter I/V, the output of which represents the output of the entire interface circuit IC.

In operation, the current generators $I_p$ and $I_t$ generate respective constant currents in the directions indicated in FIG. 4.

The circuit of FIG. 4 operates as described below.

Firstly, the case in which the input signal $V_{in}$ is a linear analog signal, of which the amplitude varies within the range defined between VH and VL, the thresholds of the comparators C1 and C2, will be considered.

With an input signal of this type, respective low level signals A and B are obtained at the outputs of the comparators C1 and C2, as shown in the portion furthest to the right in FIG. 5. Correspondingly, the signal C at the output of the NOR circuit N is permanently at a high level, and the switch $S_i$ is closed. The switch $S_p$ on the other hand is open.

The current I1 at the output of the adder S1 is therefore proportional to the input voltage $V_{in}$.

In the amplifier A1 the current I1 is multiplied by an amplification factor and, at the output of this amplifier, there is thus a current I2 which is also proportional to the input voltage $V_{in}$.

Since the input signal $V_{in}$ is a direct voltage, the current Id in the capacitor D is zero, and the current I3 at the input of the current/voltage converter I/V is consequently equal to:

$$I3 = I2 - I_t = (V_{in} - VL)/R_i - I_t$$

in which $R_i$ represents the ratio between the voltage supplied to the input of the voltage/current converter V/I and the current emitted at its output.

The converter I/V converts the current I3 into an output voltage $V_o$ equal to $$V_o = I3\ R_o = (V_{in} - VL)(R_o/R_i) - I_t\ R_o$$

wherein $R_o$ represents the ratio between the output voltage $V_o$ and the input current I3 of the current/voltage converter I/V. If the voltage $V_{in}$ becomes greater than or equal to the upper threshold VH, the switch $S_i$ opens, and the switch $S_p$ closes. This corresponds to a saturation condition of the interface circuit: the output voltage $V_o$ assumes a maximum value $V_{omax}$ given by:

$$V_{omax} = I3\ R_o = (I_p - I_t)\ R_o = (VH - VL)(R_o/R_i)$$

in which $I_p = VH/R_i$ and $I_t = VL/R_i$.

Figure 6:
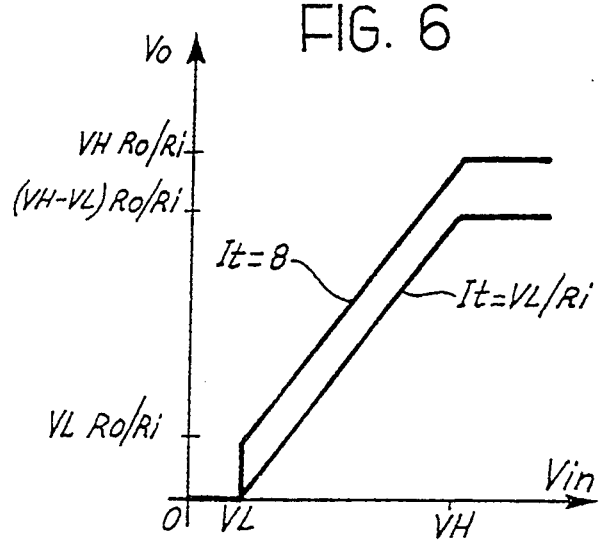

FIG. 6 shows the input/output characteristic of the interface circuit IC with variations in the current produced by the generator $I_t$. In particular, it can be seen that, if this current assumes a value $I_t = VL/R_i$, the input/output characteristic corresponds to that shown in FIG. 2.

It is now assumed that the input signal $V_{in}$ is a variable duty-cycle digital square-wave signal of frequency $f = 1/T$, that is, a PWM signal, the high and low levels of which fulfill the requirements previously specified with reference to FIG. 3.

In this case (see the wave forms of the left-hand portion of FIG. 5), the levels of the respective output signals A and B of the comparators C1 and C2 change in opposite directions when the signal $V_{in}$ crosses the thresholds VL and VH, as shown in FIG. 5. The signal C at the output of the NOR circuit N is correspondingly kept constantly at the low level, and the switch $S_1$ is permanently open.

The switch $S_p$ is opened and closed alternately, in synchronism with the changes in the level of the signal B. In particular, the switch is closed when the signal $V_{in}$ is at the high level, and is open when the signal is at the low level.

The comparator C2 and the switch $S_p$ therefore perform a type of voltage/current conversion, and apply to the input of the amplifier A1 a square-wave current the level of which varies between 0 and $I_p$, and which has a duty-cycle equal to that of the input signal $V_{in}$.

The current I2 at the output of the amplifier A1 is proportional to the current I1, and thus also has a duty-cycle substantially the same as that of the input signal $V_{in}$.

In the steady state, the capacitor D at the output of the adder S2 is charged at a mean voltage, absorbing the variations of the current square wave $I_p - I_t$. Since (if the capacitance of the capacitor D is high enough) the mean current cannot flow through the capacitor D, it flows entirely through the resistor R. The current I3, which reaches the input of the converter I/V, is therefore substantially equal to:

$$I3 = (t_{on}/T)\ I_p - I_t = d\ I_p - I_t$$

wherein d is the duty-cycle of the input signal $V_{in}$.

The output voltage $V_o$ is therefore directly proportional to the duty-cycle d:

$$V_o = d\, I_p\, R_o - I_t R_o$$

If the minimum duty-cycle is indicated $d_m$, provided that $$d_m I_p = I_t = VL/R_i,$$

unambiguous correspondence is obtained between the minimum duty-cycle and the minimum voltage VL which the signal $V_{in}$ can assume when it is of the linear analog type.

Moreover, if the maximum duty-cycle is indicated as $d_M$, unambiguous correspondence can be obtained between $d_M$ and the maximum value VH of the linear analog-type input signal, provided that $$d_M I_p = I_p = VH/R_i,$$

with $d_M$ equal to 100%.

When the input signal $V_{in}$ is of the PWM digital type, the curves of the input/output characteristic of the interface circuit IC, with variations in the offset current $I_t$ are as shown in FIG. 7.

If the parameters VH, VL, $I_p$ and $I_t$ are set and the last two conditions described above are imposed, the input-/output characteristics of the interface circuit IC for linear analog input signals and for PWM digital input signals coincide, as shown in FIG. 8.

FIG. 9 is a circuit diagram of an embodiment of the circuit IC shown in the form of a block diagram in FIG. 4.

The portion of the circuit which distinguishes between analog and PWM digital input signals $V_{in}$ comprises the comparators C1 and C2, a transistor M1, of which the input is connected to the output of the comparator C2 by means of a logic inverter I, and two further transistors M2 and M3, the inputs of which are piloted by the outputs of C1 and C2.

In the diagram in FIG. 9, the NOR circuit N of FIG. 4 consists of the transistors M3 and M2, which can connect to earth a current generator $I_{bias}$ interposed between a direct-current voltage supply VCC and the emitter of an input transistor Q1, of which the base is connected to the input terminal I.

When the input signal $V_{in}$ is of the PWM type, the transistors M2 and M3 cut off a transistor Q2, the base of which is connected to the emitter of Q1. The transistor Q2 represents the switch $S_i$ in FIG. 4.

The logic inverter I and the transistor M1 correspond to the switch $S_p$ in FIG. 4. When the input signal $V_{in}$ is of the PWM type, this transistor cyclically enables and cuts off a current-mirror circuit which consists of two transistors Q7 and Q8 and is supplied by the current generator $I_p$ which is disposed between the voltage supply VCC and the collector of Q7.

The transistor Q2 has its collector connected to that of Q8 and, together with the input transistor Q1, forms the voltage/current converter indicated V/I in FIG. 4. These transistors apply the analog input voltage $V_{in}$ to the ends of a resistor $R_i$. If the base-emitter voltages of Q1 and Q2 are equal to one another, the collector current $I_1$ of Q2 is equal to $V_{in}/R_i$.

The circuit shown in FIG. 9 includes a further current-mirror circuit formed by two transistors Q3 and Q4, of which the bases are connected to one another and the emitters are connected to VCC. The collector of the transistor Q3 is connected to the base thereof, and to the collectors of Q2 and Q8. The collector of Q4 is connected to the non-earthed plate of the capacitor D.

The current-mirror circuit formed by Q3 and Q4 carries out the functions of the current adder S1 and of the amplifier A1 of the diagram of FIG. 4, with unitary amplification.

A further current-mirror circuit formed by two transistors Q10 and Q9 is connected to the collector of Q4. The emitter of the transistor Q10 is earthed and its base is connected to that of Q9, of which the emitter is also earthed and the collector is connected to the base thereof, as well as to the current generator $I_t$.

The current-mirror circuit Q9, Q10 which is supplied by the generator $I_t$, subtracts the offset current $I_t$ from the collector current of Q4, which represents the adder S2 in FIG. 4.

A resistor R, which together with the capacitor D forms an integrator unit, is connected to the collector of Q4.

The output stage is constituted by a further current-mirror circuit comprising two transistors Q5 and Q6. The bases of these transistors are connected to one another and their emitters are earthed. The collector of Q5 is connected to the resistor R as well as to the base of the transistor Q5. The collector of Q6 is connected to VCC by means of an output resistor $R_o$.

The output voltage $V_o$ is represented by the voltage between the collector of Q6 and VCC.

A further transistor M4 is connected in parallel with the capacitor D and its input terminal constitutes a reset terminal for the output stage, enabling the capacitor D to be discharged.

The capacitance of the capacitor D must be of sufficient magnitude in relation to the envisaged minimum frequency of the input signal $V_{in}$ when it is of the PWM digital type. The voltage across this capacitor, and hence the output voltage $V_o$, is in fact subject to a ripple, which is inversely proportional to the frequency f of the signal $V_{in}$ and to the capacitance of the capacitor.

To advantage, the transistors M1–M4 are produced using MOS/Pwell technology.

The transistors Q1–Q10, on the other hand, are bipolar.

The interface circuit IC as a whole may therefore be formed with the use of mixed bipolar/MOS technology, on a single layer of metallised polysilicon, with operating voltages of, for example, 30 V for the bipolar portion and 10 V for the portion formed by MOS technology.

The interface circuit IC and the regulation and control circuit Z may possibly be formed as a single integrated device.

The interface circuit according to the invention therefore enables a direct-current electric motor, particularly a brushless motor, to be piloted equally well by means of a linear, analog control signal or by means of a PWM digital signal, supplied to one and the same input terminal.

Naturally, the principle of the invention remaining the same, the details of construction may be varied widely with respect to those described and illustrated purely by way of non-limiting example, without thereby departing from the scope of the present invention.

We claim:

1. An interface circuit for generating an analog signal to control a speed of rotation of a direct-current brushless electric motor which does not have sensors for detecting an angular position of its rotor, the interface circuit comprising:

an input terminal for receiving a control input signal indicative of the required speed of rotation;

an analog signal conditioning means for receiving an analog signal at an signal input thereof and for outputting an analog signal having an amplitude substantially proportional to an amplitude of said analog signal received at said signal input;

comparator circuitry coupled to receive the control input signal via said input terminal and configured to compare the control input signal with a maximum threshold and a minimum threshold;

the comparator circuitry providing a comparator output signal having a first state when an amplitude of the control input signal is between said thresholds, said comparator output signal having a second state when the amplitude of the control input signal is outside said thresholds;

pulse width modulation (PWM) conversion circuitry coupled to receive a PWM signal having a duty cycle and to convert said PWM signal into an analog signal having an amplitude which varies in accordance with the duty cycle of the PWM signal;

said PWM conversion circuitry having an output coupled to said signal input of said analog signal conditioning means;

said comparator circuitry being effective so that when said comparator output signal is in the first state, the comparator circuitry causes the control input signal to be provided to said signal input of said analog-signal conditioning means; and when said comparator output signal is in the second state, the comparator circuitry
  (i) prevents the control input signal from being sent to the analog-signal conditioning means,
  (ii) applies to the PWM conversion circuitry a PWM signal having a predetermined phase relationship with threshold crossings by the control input signal, and
  (iii) connects the output of the PWM conversion circuitry to the signal input of the analog signal conditioning means.

2. A circuit according to claim 1 including a further adder of which a first input is connected to the output of the current amplifier, a second input is connected to a further current generator, and the output is connected to the input of the current/voltage converter.

3. The interface circuit according to claim 1, further including a voltage/current converter having an input connected to said input terminal, a first switch, and an adder having an output;

wherein said conversion circuitry includes a current generator having an output;

wherein said first switch selectively couples an output of said voltage/current converter to said adder;

wherein said PWM conversion circuitry includes a second switch that selectively couples said current generator output to said adder;

wherein said analog signal conditioning means includes a current amplifier having an output and an input connected to said adder output, and a current/voltage converter connected to said current amplifier output;

said first and second switches being controlled by the comparator circuitry so manner that
  (i) when the control signal applied to the input terminal remains between the minimum and maximum thresholds, the first switch is closed and the second switch is open, and
  (ii) when the control signal crosses the thresholds, the first switch is open and the second switch is opened and closed in synchronism with the crossing of one of the thresholds by the control signal so that the adder outputs a PWM current signal.

4. The circuit according to claim 3 further including a capacitor coupled to the output of said current amplifier.

* * * * *